United States Patent

Karube et al.

Patent Number: 5,856,992
Date of Patent: Jan. 5, 1999

[54] GAS LASER BLOWER

[75] Inventors: Norio Karube, Machida; Yasuyuki Morita, Oshino-mura; Kenji Nakahara, Oshino-mura; Kenji Mitsui, Oshini-mura, all of Japan

[73] Assignee: Fanuc Ltd., Minamitsuru, Japan

[21] Appl. No.: 776,538

[22] PCT Filed: Jun. 6, 1996

[86] PCT No.: PCT/JP96/01540

§ 371 Date: Jan. 29, 1997

§ 102(e) Date: Jan. 29, 1997

[87] PCT Pub. No.: WO96/39732

PCT Pub. Date: Dec. 12, 1996

[30] Foreign Application Priority Data

Jun. 6, 1995 [JP] Japan ................................ 7-139515

[51] Int. Cl.$^6$ ........................................ H01S 3/22
[52] U.S. Cl. .................................................. 372/58
[58] Field of Search .................................. 372/58, 50

[56] References Cited

U.S. PATENT DOCUMENTS

| | | |
|---|---|---|
| 4,764,086 | 8/1988 | Jesinger . |
| 5,206,873 | 4/1993 | Funakubo et al .................... 372/58 |
| 5,461,636 | 10/1995 | Karube et al. ....................... 372/58 |

FOREIGN PATENT DOCUMENTS

| | | |
|---|---|---|
| 56-43429 | 9/1954 | Japan . |
| 62-159795 | 7/1987 | Japan . |
| 63-57864 | 4/1988 | Japan . |
| 1-189975 | 7/1989 | Japan . |
| 2-30448 | 1/1990 | Japan . |
| 6-122957 | 5/1994 | Japan . |
| 6-164025 | 6/1994 | Japan . |

OTHER PUBLICATIONS

Patent Abstracts of Japan, vol. 13, No. 509 [E–846], Nov. 15, 1989 for JP 01 205585 (Fanuc Ltd) , Aug. 17, 1989.
Patent Abstracts of Japan, vol. 14, No. 133 [E–0902], Mar. 13, 1990 for JP 02 001193 (Fanuc Ltd) , Jan. 5, 1990.

Primary Examiner—Leon Scott Jr.
Attorney, Agent, or Firm—Staas & Halsey

[57] ABSTRACT

In a blower for compulsorily circulating a laser gas for a gas laser apparatus, a shaft (2) of an impeller (1) is fitted with an intermediate member (66) that rotates together therewith, and rings (641, 642) are fitted individually in annular grooves (651, 652) formed on the intermediate member (66). On the other hand, a bearing holder (60) for holding a bearing (5) that supports the shaft (2) is provided with a ring holder (63) having an inner wall kept normally in contact with the respective outer peripheral surfaces of the rings (641, 642). As a result, narrow axial gaps between the rings (641, 642) and the annular grooves (651, 652) prevent gaseous impurities from getting into a gas laser circulation path through a bearing (5).

21 Claims, 6 Drawing Sheets

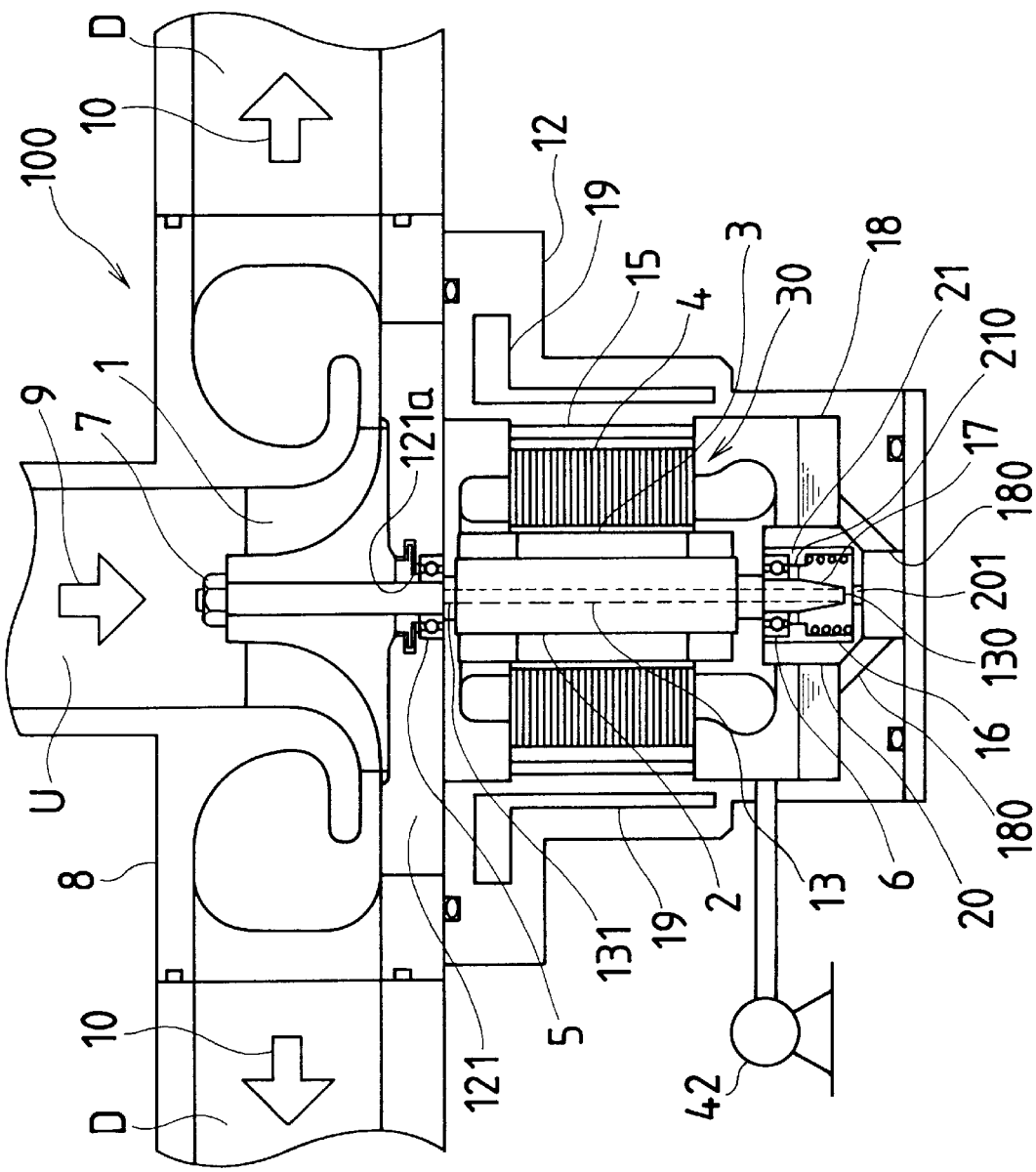

GAS LASER BLOWER

TECHNICAL FIELD

The present invention relates to a gas laser blower for compulsorily circulating a laser gas used in a gas laser oscillation apparatus and feeding it into a cooler, and more particularly, to a gas laser blower designed so that vapor from a lubricant supplied to a bearing for supporting a shaft of an impeller of the blower, gas generated from a motor for rotating the shaft and other elements, etc. are prevented from getting into a circulation path for the laser gas and being mixed in the laser gas.

BACKGROUND ART

A carbon dioxide gas laser oscillation apparatus of a high-speed axial flow type, a typical gas laser oscillation apparatus, can produce high output and high-quality laser beams with a compact design, so that it has been widely utilized for laser work, such as cutting of metallic and nonmetallic materials and welding of metallic materials and the like. In particular, this apparatus is rapidly developing as a CNC laser work machine that is coupled with a CNC (numerical control device) and used in the field of high-speed, high-accuracy cutting work for complicated shapes.

In the carbon dioxide gas laser oscillation apparatus, about 20% of injected electrical energy is converted into laser beams, and the remainder is consumed in heating of a laser gas. On the other hand, the laser oscillation gain inevitably lowers as the temperature of the laser gas increases. In order to enhance the oscillation efficiency, therefore, it is necessary to cool the laser gas compulsorily, thereby making the laser gas temperature as low as possible. Accordingly, in the carbon dioxide gas laser apparatus of the high-speed axial flow type, a gas laser blower is used to circulate the laser gas compulsorily in the apparatus and feed it into the cooler.

FIG. 6 shows a vertical gas laser blower of an oil circulation type, as an example of this gas laser blower. In a gas laser blower 100, a shaft 2 that fixes an impeller 1 is arranged vertically. When the impeller 1 rotates, a laser gas is sucked in from a cooler (not shown) on the upstream side (or above the shaft) toward the impeller 1, passing in the direction of the shaft 2 (direction of arrow 9) along an upstream-side circulation path U. Then, the laser gas is caused to be discharged in a direction (direction of arrow 10) perpendicular to the direction of axis of the shaft by the impeller 1, and flows into a cooler (not shown) on the downstream side through a downstream-side circulation path D.

After the impeller 1 is fitted on the upper end portion of the shaft 2, it is fixedly coupled to the shaft 2 by fastening the upper end of the shaft 2 by means of a nut 7. The impeller 1 fixed to the shaft 2 is covered by a circulation-path-side casing 8 that defines the laser gas circulation paths U and D.

A rotor 3 is fixed to the axial central portion of the shaft 2 by shrink fitting. The rotor 3 is covered by a motor-side casing 12. A stator 4 is fixed to that part of the motor-side casing 12 which faces the rotor 3. The rotor 3 and the stator 4 constitutes a high-frequency motor 30. As a result, the impeller 1 is rotated at a high speed of tens of thousands of rpm.

The shaft 2 is supported on the apparatus body by means of a pair of bearings 5 and 6. The bearing 5 on the upper side is provided in a communication hole 121a that is formed in a partition wall 121 between the motor-side casing 12 and the circulation-path-side casing 8. The bearing 6 on the lower side is mounted on a shaft supporting portion 20 which will be mentioned later. Normally, angular ball bearings, which can stand high-speed rotation, are used as these bearings 5 and 6, individually.

An oil passage 13 is provided in the shaft 2, extending in the axial direction thereof. A plurality of oil outlets 131 with a small bore that connect the oil passage 13 and the outside are formed in the vicinity of such part of the shaft 2 as is supported by the bearing 5.

On the lower end side of the shaft 2, an oil suction head 17, having its outer periphery tapered toward the distal end (downward), is provided integrally with the shaft 2. This oil suction head 17 is provided with an oil passage 13 that communicates with the oil passage 13 in the shaft 2, and an oil inlet 130 of the oil passage 13 is formed at the lower end of the shaft 2.

Around the lower end portion of the shaft 2 or right under the motor 30, an oil reservoir 18 is fixed to the apparatus body. Around the oil suction head 17, moreover, the cylindrical shaft supporting portion 20 is fixed integrally to the oil reservoir 18. A bottom opening (not shown) of this oil reservoir 18 is connected to one end of an oil passage 180, and the other end of the oil passage 180 communicates with an aperture 201 in the center of the bottom portion of the shaft supporting portion 20. Thus, oil in the oil reservoir 18 flows into the cylindrical shaft supporting portion 20 via the oil passage 180 and the aperture 201. The oil injected into the shaft supporting portion 20 further gets into the oil passage 13 through the oil inlet 130 at the lower end of the oil suction head 17. As a result, oil in the oil reservoir 18, oil in the shaft supporting portion 20, and oil in the oil passage 13 are all kept on the same level when the impeller 1 is stationary.

A cylindrical bearing sleeve 21 is fitted in the cylindrical shaft supporting portion 20 for axial sliding motion. This bearing sleeve 21 includes a projecting portion 210 that projects for a given length toward the axis. The upper end of the projecting portion 210 is in contact with the outer ring of the bearing 6, and the lower end in contact with the free end of a spring 16. The proximal end of the spring 16 is fixed to the bottom of the shaft supporting portion 20. Thus, the elasticity of the spring 16 first acts as a force to push up the bearing sleeve 21, and in consequence, this force is transmitted to the bearing 6, shaft 2, and bearing 5 in succession. As a result, the bearings 5 and 6 that support the shaft 2 are kept under a pre-load applied by the spring 16.

An oil return passage 15 is provided extending along the axial direction of the shaft 2 in such part of the motor-side casing 12 as surrounds the stator 4 that constitutes the motor 30. Further, a cooling water passage 19 is provided extending along the oil return passage 15 in such part of the motor-side casing 12 as surrounds the region for the oil return passage 15.

The oil in the oil passage 13 in the oil suction head 17 is pressed against the inner wall surface of the oil passage 13 by means of a centrifugal force that is produced as the shaft 2 fitted with the impeller 1 rotates. As this is done, the oil is subjected to a component force in the direction to push up the oil along the inner wall surface. As a result, the oil is sucked up rapidly, and is discharged from the oil outlets 131 through the oil passage 13 in the shaft 2. Some of the discharged oil is supplied to the bearing 5 and used to lubricate the bearing 5. The discharged oil returns to the oil reservoir 18 through the oil return passage 15. As it passes through the oil return passage 15, the oil is cooled by cooling water in the cooling water passage 19. The oil returned to the oil reservoir 18 passes through the oil passage 180, communicates with the bottom opening of the oil reservoir 18, and flows into the cylindrical shaft supporting portion 20. Then, the oil introduced into the shaft supporting portion 20 further gets into the oil passage 13 through the oil inlet 130 at the lower end of the oil suction head 17. Thus, the oil continually circulates while the shaft 2 is rotating.

In the motor-side casing 12, a lubricant supplied to the bearing 6 evaporates, and impurity gas is generated from the drive motor 30. The resulting vapor and gas may possibly get into the circulation-path-side casing 8 through the bearing 5 and the communication hole 121a formed in the partition wall 121 to which the bearing 5 is attached, and be mixed in the laser gas flowing through the circulation paths.

More specifically, the bearings 5 and 6 support the shaft 2 which is rotating at high speed, so that the lubricant to be supplied to these bearings 5 and 6 has to be particularly highly lubricative. Therefore, those lubricants with extremely low vapor pressures which are used in conventional high-vacuum apparatuses cannot be used for the purpose on account of their low lubricating properties. As a result, the lubricant selected to be supplied to the bearings 5 and 6 is easily reduced to vapor despite their low vapor pressures.

Since the shaft 2 that rotates at high speed penetrates the partition wall 121 so as to be situated both in the motor-side casing 12 and in the circulation-path-side casing 8, on the other hand, the motor-side casing 12 and the circulation-path-side casing 8 cannot be isolated entirely from each other. Thus, the vapor from the highly lubricative lubricant itself, supplied to the bearings 5 and 6, and the gas generated from the motor 30 flow into the circulation-path-side casing 8 through the communication hole 121a in the partition wall 121, and gets into the laser gas circulation paths. In some extreme cases, the lubricant itself used to get into the circulation-path-side casing 8 through a narrow gap in the partition wall 121.

As a result, the laser gas, being contaminated with the aforesaid gas and vapor, entails reduction in the laser output. Further, the substances introduced from the motor-side casing 12 into the laser gas circulation paths, being deposited on an output coupler mirror, total reflector, and other optical components that constitute an optical resonator, cause reduction in the laser output, breakage of the optical components, etc. These problems are not peculiar to the gas laser blower of an oil lubrication type, but are also aroused in the cases of grease lubrication and other lubrication systems.

Therefore, to cope with these problems, the laser gas is extracted from the laser gas circulation paths and the quantity of replenishment is increased. However these conventional countermeasures would entail an increase in the running cost of the laser oscillation apparatus.

Further, it is devised to minimize the size of the communication hole 121a for bearing attachment provided in the partition wall 121 that divides the motor-side casing 12 and the circulation-path-side casing 8. But this countermeasure would cause problems such that the machining accuracy is limited and the costs are increased for nothing, so that its effect is unsatisfactory.

In one case, moreover, the shaft 2 is provided with a disk-shaped oil thrower in order to prevent the lubricant from getting directly into the circulation-path-side casing. Also in this case, however, the through hole cannot be narrowed due to the limited machining accuracy, and there is hardly any effect on the interception of the vapor from the lubricant and the gas generated from the motor 30.

In another case, furthermore, sealing means, such as a contact-type mechanical seal, is used for sealing between the motor-side casing 12 and the circulation-path-side casing 8. In this case, however, the reliability is very poor and the required life performance cannot be enjoyed, due to wear of sliding surfaces and frictional heat therefrom, so that this countermeasure is not practicable.

DISCLOSURE OF THE INVENTION

The object of the present invention is to provide a gas laser blower for compulsorily circulating a laser gas used in a gas laser oscillation apparatus and feeding it into a cooler, the gas laser blower being provided with sealing means for effectively preventing gas, vapor, etc. generated at the elements that constitute the blower from getting into a circulation path for the laser gas and being mixed in the laser gas.

In order to achieve the above object, according to the present invention, there is provided a gas laser blower for compulsorily circulating a laser gas used in a gas laser oscillation apparatus, which includes a circulation-path-side casing constituting a circulation path for the laser gas, a motor-side housing separated from the circulation-path-side casing by a partition wall, a shaft penetrating the partition wall so that a portion projecting on the side of the circulation-path-side casing is fitted with an impeller and a portion projecting on the side of the motor-side housing is integral with or connected to an output shaft of a motor, and a bearing for supporting the shaft, the bearing being provided in such region of the partition wall as is penetrated by the shaft. In this blower, the shaft is passed through a through hole formed axially in the center of an intermediate member, having one or more annular grooves with a given depth and a given width on the outer periphery thereof, so that one of the axial end faces of the intermediate member is in contact with the impeller and that the other is in contact with an inner ring of the bearing; rings are fitted individually in the annular grooves of the intermediate member; and a ring holder constituting part of the partition wall is arranged so that the inner wall thereof is normally in contact with the rings fitted individually in the annular grooves of the intermediate member, so that the rings fitted in the annular grooves prevent impurities, such as gas and vapor, from the motor-side casing from getting into the circulation-path-side casing through the partition wall.

According to the present invention, as described above, the shaft of the impeller penetrating the partition wall that divides the circulation-path-side casing and the motor-side casing, in the gas laser blower, is supported by means of the bearing provided in the partition wall, while the bearing is provided with the sealing means that can effectively prevent the gas and vapor produced in the motor-side casing from flowing into the circulation-path-side casing, so that the laser gas flowing through the circulation path can be prevented from being contaminated with the gas and vapor and causing reduction in the laser output.

BRIEF DESCRIPTION OF THE DRAWINGS

FIG. 6 is a view showing an arrangement of a prior art gas laser blower.

BEST MODE FOR CARRYING OUT THE INVENTION

Figure 2:
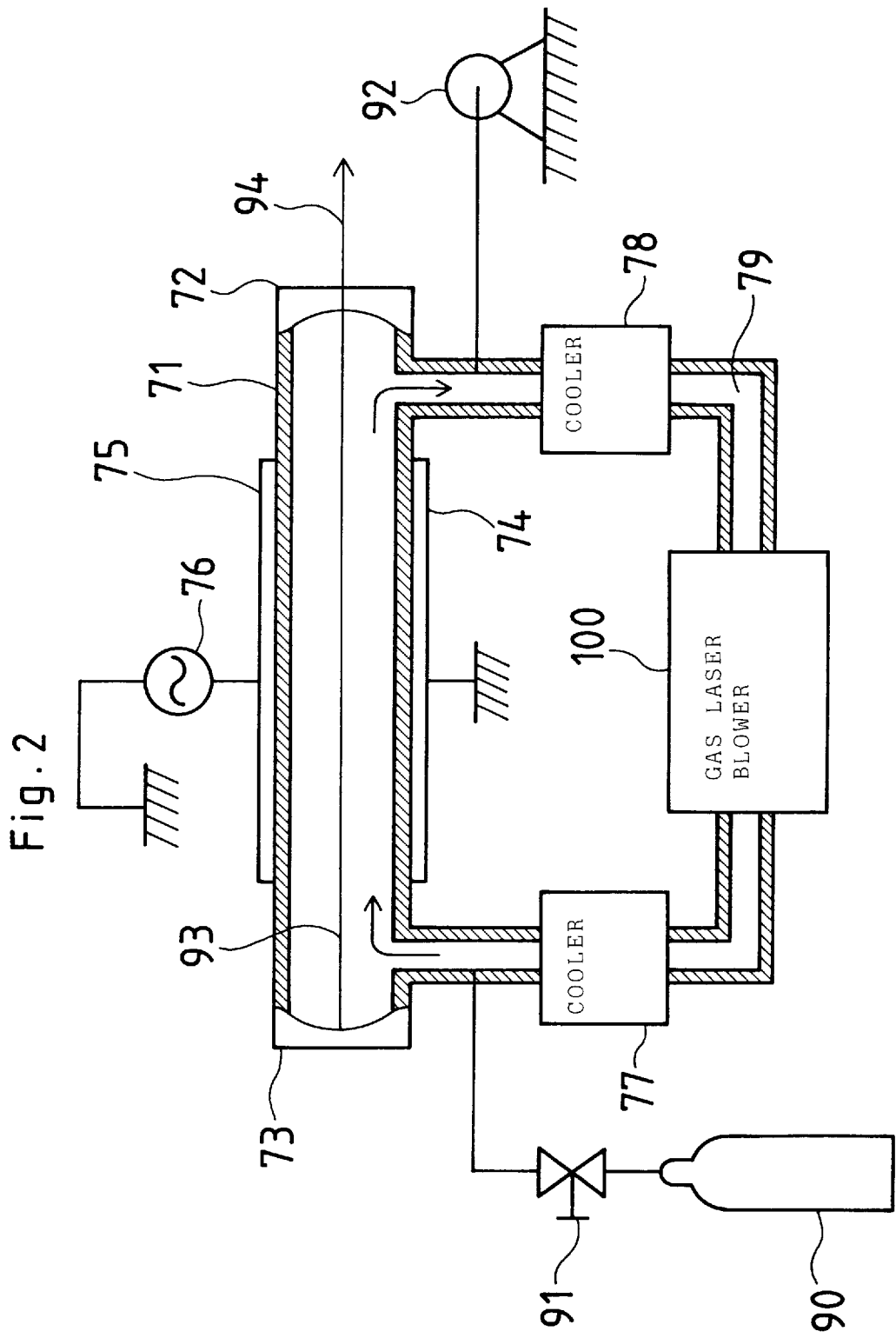
FIG. 2 is a view showing a general arrangement of a carbon dioxide gas laser oscillation apparatus in which the gas laser blower according to the present invention is incorporated.

FIG. 2 is a view showing a general arrangement of a carbon dioxide gas laser oscillation apparatus in which a gas laser blower according to the present embodiment is incorporated. In FIG. 2, an optical resonator formed of an output coupler mirror 72 and a total reflector 73 is provided on either end of a discharge tube 71. A pair of metal electrodes 74 and 75 are mounted on the outer periphery of the discharge tube 71. The one metal electrode 74 is grounded, while the other metal electrode 75 is connected to a high-frequency power source 76. A high-frequency voltage from the high-frequency power source 76 is applied between the metal electrodes 74 and 75. Thereupon, high-frequency glow discharge occurs in the discharge tube 71, and laser excitation is effected. The laser excitation generates in the discharge tube 71 a laser beam 93, part of which is taken out as a laser beam 94 through the output connecting mirror 72.

In starting the carbon dioxide gas laser apparatus arranged in this manner, whole gas within the apparatus is discharged without fail first from part of a laser gas circulation path 79 by a vacuum pump 92. Then, a valve 91 is opened so that a laser gas is introduced from a gas bomb 90 at a given flow rate, whereupon the gas pressure in the apparatus reaches a prescribed value. Thereafter, exhaust of the vacuum pump 92 and gas resupply from the steel gas cylinder continue, and some of the laser gas is continually replaced with fresh gas with the gas pressure in the apparatus kept at the prescribed value. By doing this, the apparatus can be prevented from internal gas contamination.

In the carbon dioxide gas laser, about 20% of injected electrical energy is converted into laser light, and the remainder is consumed for heating of gas. Theoretically, however, the laser oscillation gain is proportional to the −(3/2)th power of the absolute temperature T, so that the laser gas has to be compulsorily cooled in order to enhance the oscillation efficiency. Accordingly, the laser gas is circulated in the circulation path 79 by a gas laser blower 100 arranged in the circulation path 79.

The laser gas flows through the discharge tube 71 at a flow rate of about 200 m/sec or more in the direction indicated by the arrow shown in FIG. 2, and is guided into a cooler 78 on the upstream side of the blower. The cooler 78 serves mainly to clear the laser gas of heating energy that is generated by electrical discharge. The gas laser blower 100 receives and compresses the laser gas cooled by the cooler 78. The compressed laser gas is returned to the discharge tube 71 through the a cooler 77 on the lower-course side of the blower. The cooler 77 serves to remove compression heat from the laser gas compressed by the gas laser blower 100. Since these coolers 77 and 78 are well-known, a detailed description of them is omitted.

The gas laser blower 100 is driven by means of an inverter (not shown). Normally, the rotational frequency of this gas laser blower 100 is as high as tens of thousands of rpm, so that such an inverter is a high-frequency inverter in accordance with the rotational frequency of the blower 100.

Figure 3:
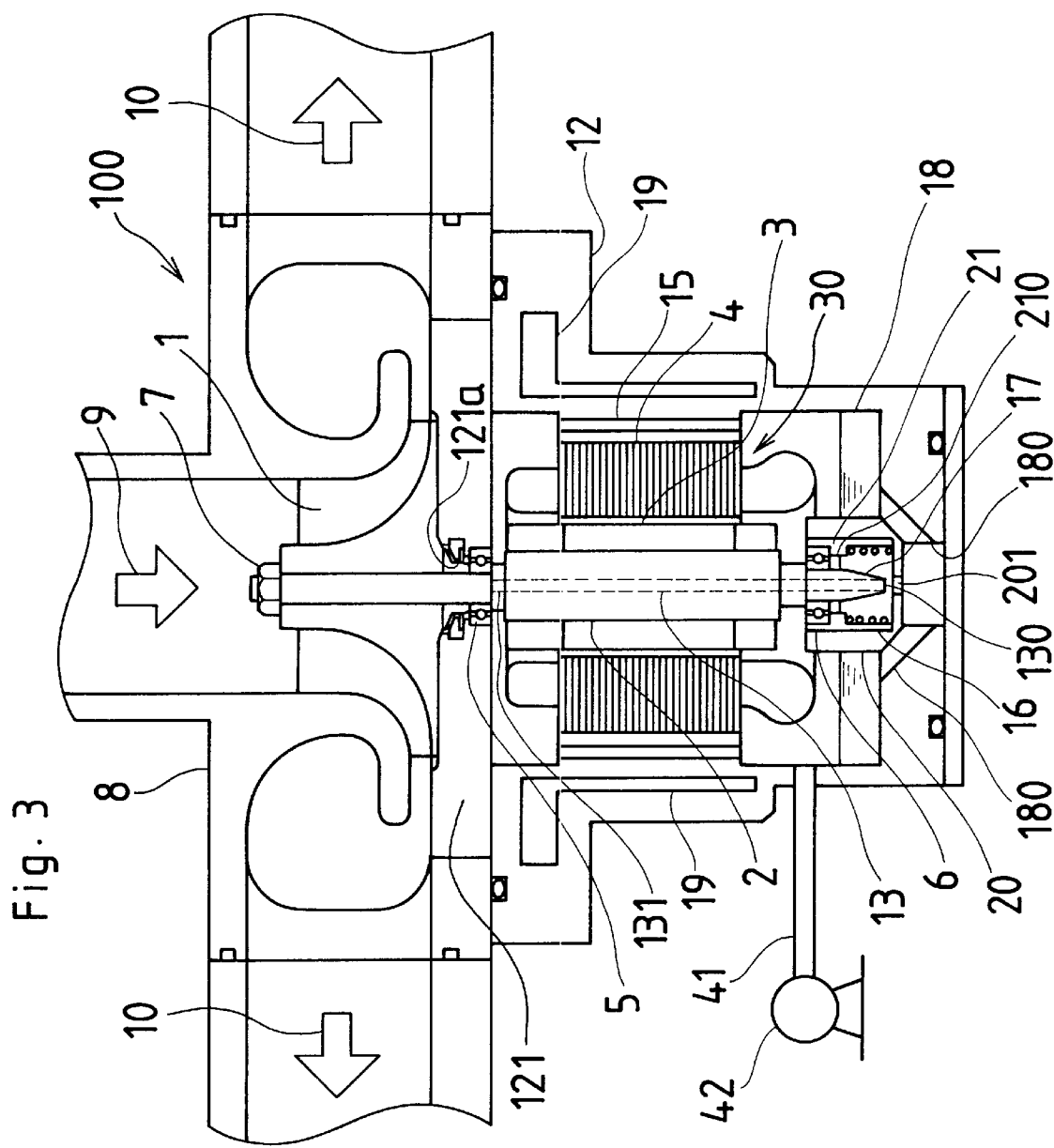
FIG. 3 is a sectional view showing part of the gas laser blower according to the present invention.

FIG. 3 is a sectional view showing an arrangement of the gas laser blower 100 according to the present embodiment. As the arrangement of this gas laser blower 100 is rather similar to that of the conventional gas laser blower 100 previously described with reference to FIG. 6, the same reference numerals are used for component parts identical with or correspond to those of the gas laser blower 100 shown in FIG. 6. In the description of the arrangement of the gas laser blower 100 according to the present embodiment to follow, therefore, only those portions characteristic of the present invention will be explained.

One end of a vacuum exhaust pipe 41 faces on a motor-side casing 12, while the other end is connected to a vacuum exhaust device 42. Thus, the laser gas introduced from a circulation-path-side casing 8 to the motor-side casing 12 is discharged out of the apparatus as the vacuum exhaust 42 is actuated. While the vacuum exhaust device 42 is a device separate from a vacuum pump 92 (see FIG. 2) that is incorporated in the laser apparatus, it is possible to make the vacuum pump 92 to serve concurrently as the vacuum exhaust device 42. By doing this, the manufacturing cost of the gas laser apparatus can be reduced.

Figure 1:
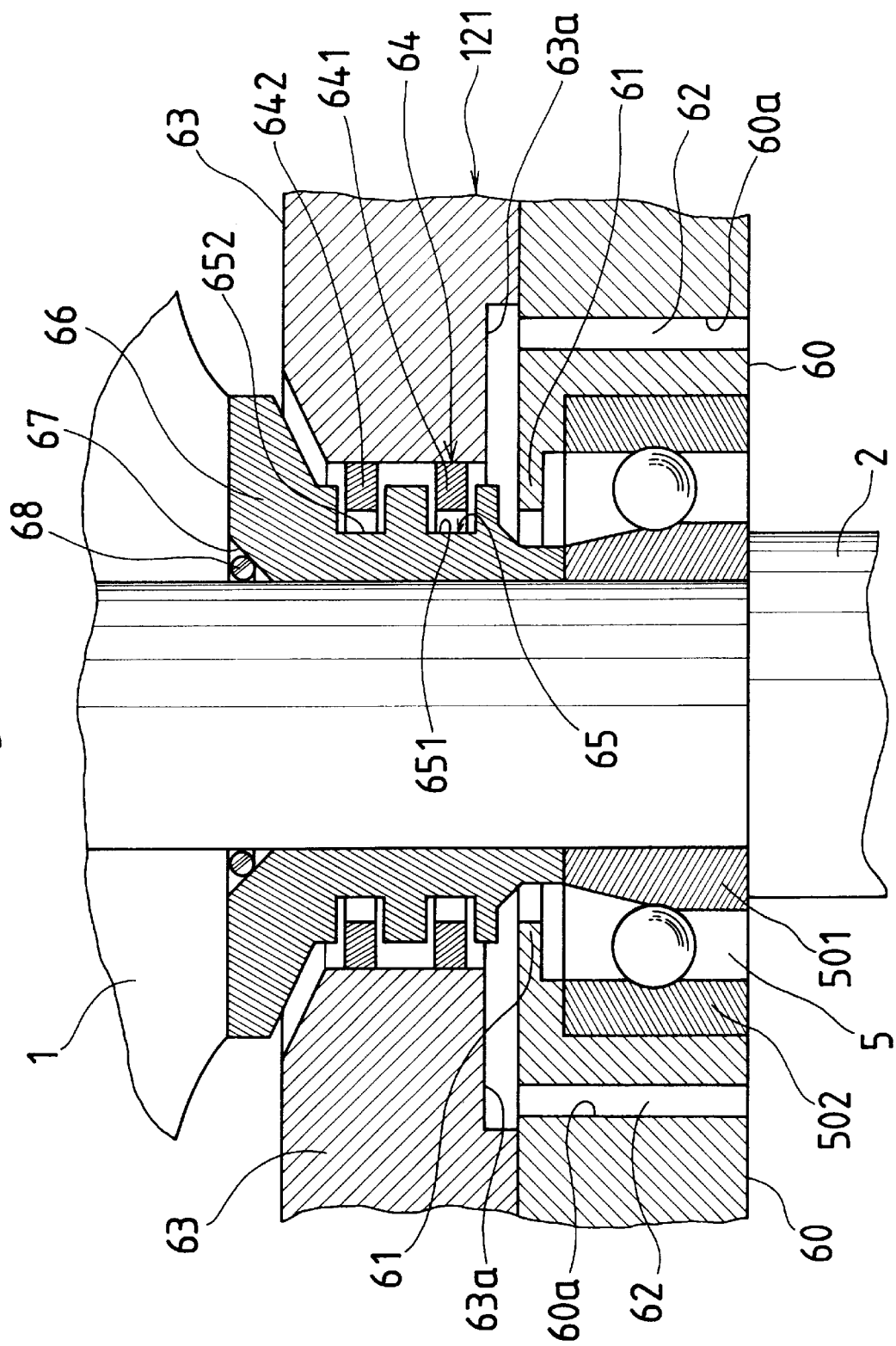
FIG. 1 is a sectional view of the principal part of a gas laser blower according to the present invention.

Referring now to FIG. 1, an arrangement associated with an upper bearing 5 for supporting a shaft 2, which is fitted with an impeller 1 of the gas laser blower 100, will be described.

This bearing 5 is provided between the shaft 2 and a through hole in a partition wall 121 that divides the circulation-path-side casing 8 and the motor-side housing 12. Such portion of the shaft 2 vertically penetrating the partition wall 121 through the bearing 5 as is situated in the circulation-path-side casing 8 passes through an axially extending through hole that is formed in the center of an intermediate member 66. One or two or more annular grooves 65 having a given depth and a given width are formed on the outer periphery of this intermediate member 66. Two annular grooves 651 and 652 are formed in the case shown in FIG. 1.

When the shaft 2 is passed through the through hole in the center of the intermediate member 66, the upper end face and lower end face of the member 66 are in contact with the impeller 1 and the upper end face of an inner ring 501 of the bearing 5, respectively, as shown in FIG. 1. When a nut 7 (see FIG. 3) in engagement with a thread groove on the upper end of the shaft 2 is tightened, the intermediate member 66 is kept clamped between the impeller 1 and the bearing 5, and rotates together with the impeller 1 and the inner ring 501 of the bearing 5 as the shaft 2 rotates.

An O-ring groove 67 is formed on the edge of the central through hole in the upper end face of the intermediate member 66, and an O-ring 68 is disposed therein. This O-ring 68 serves to prevent vapor from a lubricant supplied to the bearings 5 and 6 from getting into the circulation-path-side casing 8 through a narrow gap between the shaft 2 and the central through hole of the intermediate member 66.

The partition wall 121 on the boundary between the circulation-path-side casing 8 and the motor-side casing 12 includes a bearing holder 60 and a ring holder 63. The bearing holder 60 holds the bearing 5. On the other hand, the ring holder 63 has a given thickness and is formed with a through hole having a given inside diameter in the center. When the ring holder 63 is assembled in the blower so that it constitutes part of the partition wall 121, the center of its through hole is in line with the axis of the shaft 2, and the inner wall that constitutes the through hole faces the outer peripheral surface of the intermediate member 66 in engagement with the shaft 2 at a predetermined distance therefrom.

Figure 4A:
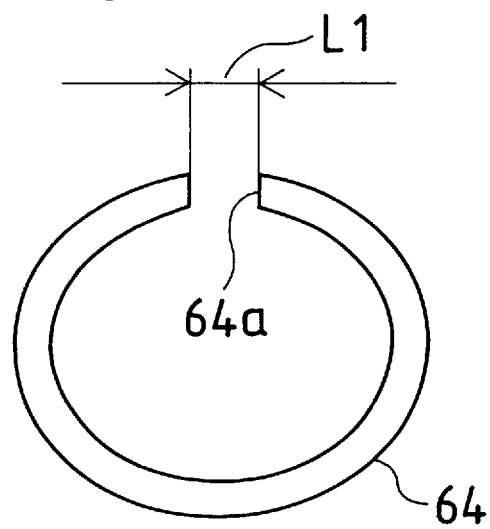
FIG. 4A is a view showing a ring member to be used in the gas laser blower according to the present invention, which is in a free state.

Rings 64 (641 and 642) having shape as shown in FIG. 4A are fitted individually in the annular grooves 65 (651 and 652) of the intermediate member 66. A slit 64a is cut in each ring 64 so that the ring 64 is not in the form of an entire circle, as shown in FIG. 4A, when it is not subjected to any external force, and the slit has a size L1 of approximately 3 mm. When this ring 64 is fitted in the annular groove 65, a substantial gap is formed between the inner peripheral surface of the ring 64 and the bottom of the annular groove 65, and the greater part of the ring 64 is situated outside the annular groove 65.

When the ring 64 is interposed between the annular groove 65 of the intermediate member 66 and the ring holder 63, as shown in FIG. 1, however, the form of the ring 64 is restricted by the inner wall of the ring holder 63, so that the size of the slit 64a is reduced to L2 (=0.2 mm or less, preferably 0.1 mm) much smaller than L1, and the ring shape nears an entire circle.

The ring 64 is formed of a sintered metal based on stainless steel. The thickness of the ring 64 is designed so that the axial gap between the ring and the annular groove that contains it is 0.3 mm or less.

The gap size L2 of the slit in the mounted ring 64 is very important, as in the case of the size of the axial gap between the ring 64 and the annular groove 65, since impurities from the motor-side casing 12 get into the circulation-path-side casing 8 through the slit.

If the two annular grooves 65 are formed on the intermediate member 66, as shown in FIG. 1, and if the rings 641 and 642, such as the one shown in FIG. 4A, are arranged in those annular grooves 651 and 652, respectively, in a manner such that their respective slits 64a are deviated from each other, moreover, the gas and vapor in the motor-side casing 12 seldom get into the circulation-path-side casing through the slits of the rings 641 and 642. Preferably, the positional deviation between the respective slits 64a of the rings 641 and 642 is given by an angle of 30° or more, most preferably 180°.

The intermediate member 66 is formed of magnetic stainless steel. The magnetic material is used in order that the intermediate member 66 can be magnetically chucked while the annular grooves 65 and the like are formed by machining. In general, machining a workpiece fixed by magnetic chucking can shorten the time for arrangements and ensure high accuracy. On the other hand, the use of stainless steel ensures high corrosion resistance. Further, the intermediate member 66 is nitrided after the grooves 65 are formed. This is done in order to secure satisfactory wear resistance even at the start of rotation immediately after assembly or in case the rings 64 and the annular grooves 65 are brought into contact by a change in temperature of the shaft 2. The nitriding treatment keeps the surface hardness of the annular grooves 65 at Hv 800 (Vickers hardness) or more. The nitriding treatment may be replaced with vacuum hardening with substantially the same result.

Since the intermediate member 66 may possibly have already been magnetized by magnet chucking during the work or by other handling methods, it is demagnetized in advance to 10 G or less before assembly. This is done in order to prevent abrasion dust, which may possibly be produced when the annular grooves 65 and the rings 64 come into contact with one another, or magnetic foreign matter, if any, in the lubricant from being collected in the region near the annular grooves 65 by the magnetic force of the intermediate member 66 and caught in the gaps between the annular grooves 65 and the rings 64.

Figure 4B:
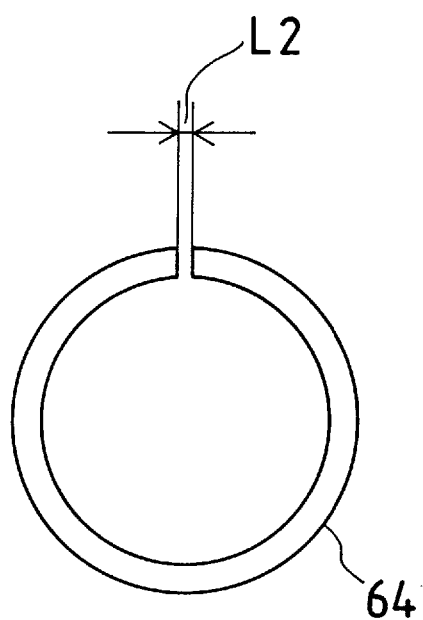
FIG. 4B is a view showing the ring member of FIG. 4A to be used in the blower of the present invention to shut out gas and the like by sealing.

The outer peripheral surface of the ring 64 in each annular groove 65 is normally in contact with the inner wall of the ring holder 63, so that the gap of the slit 64a of the ring is narrowed from L1 (FIG. 4A) to L2 (FIG. 4B). Accordingly, the ring 64 is subjected to a reaction force by its own elasticity so that the slit gap increases from L2 toward L1, and continually presses on the inner wall of the ring holder 63, thus supporting itself in the ring holder 63 by means of friction on the contact surfaces. Since ring 64 is not fixed at all in the axial direction, however, it can freely move within the range of the transverse gap in the annular groove 65.

When the gas laser blower 100 is actuated to cause the shaft 2 of the impeller 1 and the intermediate member 66 to rotate, the ring 64 is not normally in contact with the inner wall surface. This is because the thickness of the ring 64 is smaller than the width of the annular groove 65, so that a radial gap of a certain size is formed between the ring 64 and the annular groove 65 when an axial gap of a certain size is formed between the annular groove 65 and the ring 64 with the outer peripheral surface of ring 64 in contact with the inner wall of the ring holder 63. If the ring 64 comes into contact with the inner wall of the annular groove 65 while the intermediate member 66 is rotating, however, the ring 64 is automatically moved in the direction opposite to the direction of the contact by reaction, so that it is immediately restored to a state where it is not in contact with the annular groove 65. This automatic adjustment of the ring 64 to the noncontact state is effected even though the position of the annular groove 65 is somewhat deviated in the axial direction by thermal expansion that is caused when the shaft 2 is subjected to a temperature change while it is rotating. This automatic adjustment effect obviates the necessity of requiring undue machining accuracy of the components in the gaps that determine the sealing performance.

When the ring 64 comes into contact with the inner wall of the annular groove 65, fine abrasion dust is produced and gets into the bearing 5, thereby damaging the rolling surface of the bearing 5 and lowering the life performance of the bearing 5. In order to prevent this, according to the present embodiment, the bearing holder 60 is formed integrally with a bearing cover 61 that projects between the bearing 5 and the rings 64. It is advisable for the bearing cover 61 to cover the bearing 5 to a maximum possible degree, thereby preventing the fine abrasion dust falling from above from getting into the bearing 5. Actually, however, it is difficult to cover the bearing 5 entirely with the bearing cover 61 in consideration of the surrounding structures. Nevertheless, it is of a practical use to cover at least 50% of the area of an axial projection of an opening between the inner ring 501 and an outer ring 502 of the bearing 5. If 70% is covered, the fine abrasion dust can be restrained to a considerable degree from getting into the bearing 5.

In order to guide the fine abrasion dust on the bearing cover 61 to the outside of the apparatus, moreover, a discharge path 62 is formed on the ring holder 63 and the bearing holder 60. The discharge path 62 is composed of a first path 63a, which is defined between the bearing cover 61 and a recess formed in that region of the lower surface of the ring holder 63 which faces the bearing cover 61, and a second path 60a, which is formed in the axial direction in the bearing holder 60 so as to communicate with the first path 63a. In this arrangement, the fine abrasion dust dropped from between the lowest of a plurality of rings 64 (two in number), that is, the ring 641 nearest to the bearing cover 61, and the annular groove 651 in which the ring 641 is fitted is deposited on the distal end of the bearing cover 61, then passes through the first and second paths 63a and 60a, and is discharged from the apparatus, thereafter.

This discharge path 62 is expected to have a sectional area wide enough to allow the lubricant and the fine abrasion dust to pass quickly, and has an area of 2 mm$^2$ or more according to the present embodiment. Preferably, the bearing cover 61 and the ring 64 nearest thereto are kept at a distance of 1.5 mm or more.

Further, some of the laser gas in the circulation-path-side casing 8 goes toward the motor-side casing 12 through the gaps between the rings 64 and the annular grooves 65, and this gas is discharged from the apparatus through the vacuum exhaust pipe 41 by the vacuum exhaust device 42. The flow of the gas prevents gaseous impurities produced in the motor-side casing 12 from getting into the circulation-path-side casing 8, since the gas flows in the direction opposite to the direction in which the impurities flow into the circulation-path-side casing 8 through the narrow axial gaps between the rings 64 and the annular grooves 65 and the gaps in the slits 64a.

When some of the laser gas in the circulation-path-side casing 8 is thus discharged from the apparatus by the vacuum exhaust device 42, the laser gas has to be newly resupplied to the circulation path, in a quantity corresponding to the discharged volume. Since the gaps between the rings 64 and the annular grooves 65 and the width of the slits 64a of the rings 64 are small, however, the quantity of the laser gas discharged from the apparatus by the vacuum exhaust device 42 is very small.

Figure 5:
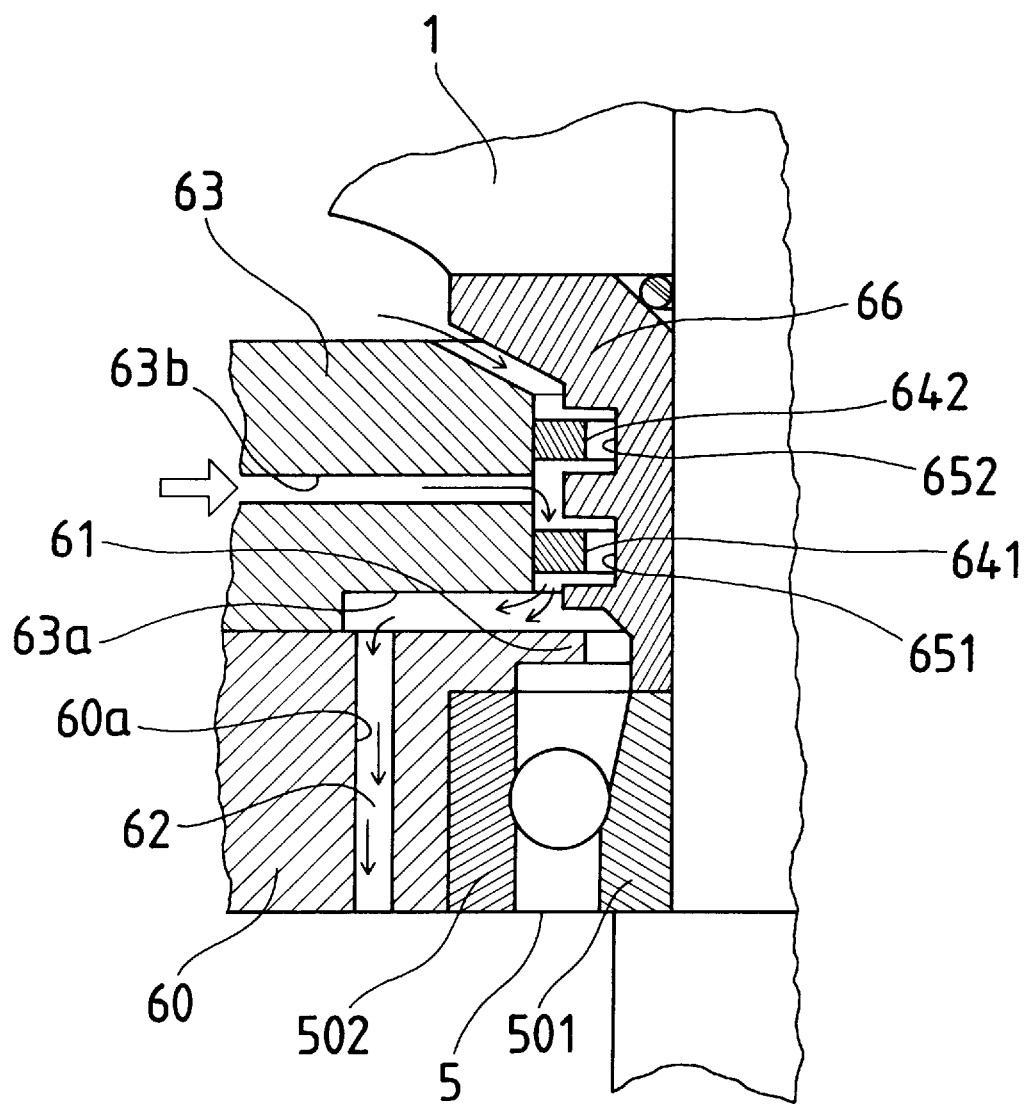
FIG. 5 is a sectional view showing an arrangement obtained by further improving the principal part shown in FIG. 1.

As shown in FIG. 5, moreover, the ring holder 63 is formed with a gas blowoff passage 63b that opens between the rings 641 and 642. When the fresh gas is fed through the gas blowoff passage 63b, the gas forced out through the aforesaid opening into the region between the rings 641 and 642 is supplied to the motor-side casing 12 through the gap between the ring 641 on the side of the bearing 5 and the groove 651 that receives this ring 641, and is discharged by the vacuum exhaust device 42. The fresh gas supplied to the motor-side casing 12 through the gap between the ring 641 and the groove 651 serves to prevent the gaseous impurities produced on the side of the motor-side housing 12 from getting into the circulation-path-side casing 8 through the gap between the ring 641 and the groove 651. If a laser gas is used as the fresh gas to be fed into the gas blowoff passage 63b, the laser gas supplied to the circulation-path-side casing 8 through the gap between the ring 642 and the annular groove 652 is utilized for the replenishment for the portion of the laser gas passing in the circulation path which leaked out into the motor-side casing 12 and was discharged from the apparatus.

According to the present invention, as described above, the annular grooves 65 formed on the member (intermediate member 66) that rotates together with the shaft 2 of the impeller 1, the ring holder 63 connected to the member (bearing holder 60) holding the outer ring of the bearing 5 that supports the shaft 2, and the rings 64 are combined to constitute a sealing mechanism for sealing the circulation-path-side casing and the motor-side casing. For effective sealing by means of this sealing mechanism, it is particularly important only to keep the axial gap between the annular groove 65 and the ring 64 within the considerably narrow range of 0.3 mm or less and keep the gap of the slit 64a of the ring 64 at 0.2 mm or less, as mentioned before. The axial gap can be automatically adjusted to several micrometers to 0.3 mm in a contacted (zero-gap) state. The dimensional accuracy of other elements has no substantial influence upon the sealing properties. On the whole, therefore, the elements that constitute the sealing mechanism can be manufactured at low cost.

The axial gap between the annular groove 65 and the ring 64 is restricted to the small value of 0.3 mm in order that it may strongly resist the lubricant supplied to the bearing 6 in the motor-side casing 12, vapor form the lubricant, and impurities such as the gas generated from the motor that are going to flow into the circulation-path casing 8 through the axial gap between the annular groove 65 and the ring 64. Since the automatic adjustment continually maintains the gap of several micrometers to 0.3 mm between the annular groove 65 and the ring 64, as mentioned before, the operating time of the gas laser blower 100 never results in wear or other problems, so that the sealing effect cannot be lowered.

According to the present embodiment, moreover, the slit 64a is provided in part of the ring 64. Therefore, the ring 64 can be easily fitted in the annular groove 64 of the intermediate member 66 by deforming the ring 64 so that the slit 64a is widened within its elastic limit and inserting the intermediate member 66 into the ring. Since the outer peripheral surface of the ring 64 fitted in the annular groove 64 is continuously pressed against the inner wall of the ring holder 63 by an elastic force, furthermore, the ring or the ring holder can be machined without requiring any special care for the continuous maintenance of the contact between the ring and the ring holder 63. Thus, the manufacturing cost can be reduced.

Further, the ring 64 can realize effective sealing through the contact with the ring holder 63 without being increased in thickness. Thus, the annular groove 65 of the intermediate member 66 need not be wide. As a result, the axial length of the intermediate member 66 can be lessened, so that the distance from the bearing 5 to the end of the impeller 1 can be shortened. Accordingly, the stability and durability of the impeller 1 in rotation are improved, and the product accuracy is enhanced.

Since the ring 64 is axially slidable on the inner wall of the ring holder 63, furthermore, the insertion of the intermediate member 66, which mounts the ring 64 in its annular groove 65, into the center of the ring holder 63 is possible without any special consideration. Thus, the intermediate member 66, ring 64, and ring holder 63 can be assembled with ease.

Although an example of a blower based on oil lubrication has been described in connection with the present embodiment, the same sealing effect can be obtained by any other lubrication method such as grease lubrication. Also, a satisfactory sealing effect can be obtained for outgassing from the motor and the like according to a system that uses no lubricant.

According to the present invention, as described above, the annular grooves are formed along the peripheral direction of the shaft, in the region between the bearing and the impeller, and the ring members that are fitted individually in the annular grooves with a given axial space between them are provided on the inner wall of the communication hole in the partition wall between the circulation-path-side casing and the motor-side casing, so that the circulation-path-side casing and the motor-side casing can be sealed depending only on the accuracy of the axial gaps between the ring members and the grooves. Accordingly, necessary reliability and life performance can be secured without taking care of the dimensional accuracy of any other portions. Thus, the quantities of substances that are harmful to laser oscillation and flow from the motor-side casing into the impeller-side casing can be securely reduced despite the high assembling properties and moderate price.

We claim:

1. A gas laser blower for compulsorily circulating a laser gas used in a gas laser oscillation apparatus, comprising:

a circulation-path-side casing constituting a circulation path for the laser gas;

a motor-side housing separated from said circulation-path-side casing by a partition wall;

a shaft penetrating said partition wall so that a portion projecting on the side of the circulation-path-side casing is fitted with an impeller and a portion projecting on the side of said motor-side housing is integral with or connected to an output shaft of a motor; and a bearing for supporting said shaft, which is provided in such region of said partition wall as is penetrated by said shaft, wherein, said shaft is passed through a through hole formed axially in the center of an intermediate member, having one or more annular grooves with a given depth and a given width on the outer periphery thereof, so that one of the axial end faces of the intermediate member is in contact with said impeller while the other is in contact with an inner ring of said bearing;

rings are fitted individually in the annular grooves of said intermediate member; and a ring holder constituting part of said partition wall is arranged so that the inner wall thereof is normally in contact with the rings fitted individually in the annular grooves of said intermediate member;

so that said rings fitted in said annular grooves prevent impurities, such as gas and vapor, from said motor-side casing from getting into the circulation-path-side casing through said partition wall.

2. A gas laser blower according to claim 1, wherein an O-ring groove for the arrangement of an O-ring is formed on that portion of the impeller-side end face of said intermediate member which is situated close to the axis thereof.

3. A gas laser blower according to claim 1, wherein said intermediate member is formed of magnetic stainless steel as a material.

4. A gas laser blower according to claim 1, wherein said intermediate member is subjected to a nitriding treatment after the formation of the annular grooves.

5. A gas laser blower according to claim 1, wherein said intermediate member is subjected to vacuum hardening after the formation of the annular grooves.

6. A gas laser blower according to claim 1, wherein said intermediate member is subjected to demagnetization before assembly.

7. A gas laser blower according to claim 1, wherein said ring is subjected to demagnetization in advance of assembly.

8. A gas laser blower according to claim 1, wherein said ring is designed so that the axial gap between the ring and the groove of the intermediate member receiving the ring has a width of 0.3 mm or less.

9. A gas laser blower according to claim 1, wherein said ring is formed of a sintered metal based on stainless steel.

10. A gas laser blower according to claim 1, wherein said ring partially has a slit designed so that the width of the slit is great when in a free state and becomes smaller when the ring is incorporated in the blower, whereby an elastic force acts so as to spread the outer periphery of the ring itself.

11. A gas laser blower according to claim 10, wherein the gap of the slit of said ring is adjusted to about 1 mm when in the free state and to 0.2 mm or less when the ring is incorporated in the blower.

12. A gas laser blower according to claim 1, wherein said intermediate member is formed of two annular grooves, and the rings fitted individually in the annular grooves partially have their respective slits such that the respective positions of the slits are deviated from each other when the rings are fitted individually in the annular grooves.

13. A gas laser blower according to claim 12, wherein the angle of deviation between said slits is at 30° or more.

14. A gas laser blower according to claim 1, wherein said ring partially has a slit designed so that the width of the slit is great when in a free state and becomes smaller when the ring is incorporated in the blower, whereby an elastic force acts so as to spread the outer periphery of the ring itself, and said ring holder has an inner peripheral surface, coaxial with said annular groove, which receives the ring subjected to said elastic force and to which the ring can slide in the axial direction.

15. A gas laser blower according to claim 1, wherein a bearing holder constituting part of said partition wall and fitted with said bearing is formed with a bearing cover projecting between said bearing and the ring and covering at least part of the bearing.

16. A gas laser blower according to claim 15, wherein said ring holder is partially cut so that a first path is formed between said bearing cover and the ring situated nearest thereto, and said bearing holder is formed with a second path to communicate with the first path, whereby the first and second paths communicating with each other are used as discharge paths through which a lubricant and fine abrasion dust can pass.

17. A gas laser blower according to claim 16, wherein the sectional area of said second path is 2 $mm^2$ or thereabout.

18. A gas laser blower according to claim 16, wherein the distance between said bearing cover and the ring situated nearest thereto is at least 1.5 mm.

19. A gas laser blower according to claim 1, wherein one end of a vacuum exhaust path is connected to said motor-side casing while the other end of that is connected to the vacuum exhaust device, and the vacuum exhaust device serves to discharge the laser gas, introduced from the circulation-path-side casing into the motor-side casing through the gaps between said rings and the annular grooves, to the outside of the apparatus.

20. A gas laser blower according to claim 19, wherein said ring holder is provided with a gas blowoff passage which opens in that surface thereof which is in contact with the rings and designed so that at least some of a gas having passed through the gas blowoff passage and got out of the opening thereof gets into the motor-side casing through the gaps between said rings and the annular grooves of said intermediate member, and is discharged from the apparatus by said vacuum exhaust device.

21. A gas laser blower according to claim 19, wherein the gas passing through said gas blowoff passage is a laser gas, and some of the laser gas having got out of the opening of said passage is supplied to the circulation-path casing through the gap between the ring situated on the circulation-path-casing side of said opening and the annular groove of said intermediate member in engagement with the ring, and is utilized as a laser gas to be resupplied to the laser circulation path.

* * * * *